(12) United States Patent
Ypyä et al.

(10) Patent No.: US 7,889,869 B2
(45) Date of Patent: Feb. 15, 2011

(54) METHODS AND APPARATUS TO INTEGRATE MOBILE COMMUNICATIONS DEVICE MANAGEMENT WITH WEB BROWSING

(75) Inventors: Tapio Ypyä, Perttula (FI); Gaurav Mittal, Tampere (FI)

(73) Assignee: Nokia Corporation, Espoo (FI)

( * ) Notice: Subject to any disclaimer, the term of this patent is extended or adjusted under 35 U.S.C. 154(b) by 1189 days.

(21) Appl. No.: 10/923,439

(22) Filed: Aug. 20, 2004

(65) Prior Publication Data

US 2006/0039561 A1 Feb. 23, 2006

(51) Int. Cl.
*H04K 1/00* (2006.01)
(52) U.S. Cl. ...................................... 380/270
(58) Field of Classification Search ................ 380/270; 726/29; 725/114
See application file for complete search history.

(56) References Cited

U.S. PATENT DOCUMENTS

| | | | |
|---|---|---|---|
| 5,694,546 A | 12/1997 | Reisman | 395/200.9 |
| 6,125,388 A | 9/2000 | Reisman | 709/218 |
| 6,594,692 B1 | 7/2003 | Reisman | 709/219 |
| 6,654,796 B1 | 11/2003 | Slater et al. | 709/220 |
| 6,658,464 B2 | 12/2003 | Reisman | 709/219 |
| 7,072,984 B1 * | 7/2006 | Polonsky et al. | 709/246 |
| 7,225,249 B1 * | 5/2007 | Barry et al. | 709/227 |
| 7,275,243 B2 * | 9/2007 | Gibbons et al. | 717/159 |
| 2002/0166001 A1 | 11/2002 | Cheng et al. | 710/1 |
| 2003/0018767 A1 * | 1/2003 | Chatani et al. | 709/223 |
| 2004/0034853 A1 | 2/2004 | Gibbons et al. | 717/174 |

FOREIGN PATENT DOCUMENTS

| | | |
|---|---|---|
| EP | 1 376 990 A2 | 1/2004 |
| JP | 2003-318802 | 11/2003 |
| JP | 2004-206188 | 7/2004 |
| JP | 2004-227274 | 8/2004 |
| WO | WO-02087135 A2 | 10/2002 |

OTHER PUBLICATIONS

"SyncML Device information DTD, version 1.1", Feb. 15, 2002, pp. 1-38.
"Device Management—Adopting Mobile Services Effortlessly", 2003, 12 pages.

(Continued)

*Primary Examiner*—Ellen Tran
(74) *Attorney, Agent, or Firm*—Harrington & Smith (57) ABSTRACT

A method includes, in response to receiving a certain type of HTTP request message from a device during a browsing session, sending a HTTP response message to the device. The HTTP response message includes a dedicated MIME-type for indicating that a device management session is being initiated, and the device management session is identified by an identifier that forms part of the HTTP response message. The device replies to the HTTP response message with a device management session reply that comprises device details and the identifier. Using the device details, the system develops a list containing at least one download option that is compatible with the device and sends the list to the device. In response to a user selecting the at least one download option from the list, the system delivers the selected at least one download option to the device during a device management session.

20 Claims, 5 Drawing Sheets

OTHER PUBLICATIONS

"HTTP State Management Mechanism", D. Kristol et al., IETF 2109, Feb. 1997, pp. 1-20.

"Hypertext Transfer Protocol—HTTP/1.1", R. Fielding et al., IETF 2616, Jun. 1999, pp. 1-165.

"MIME (Multipurpose Internet Mail Extensions) Part Two: Message Header Extensions for Non-ASCII Text", K. Moore, IETF 1522, Sep. 1993, pp. 1-10.

"MIME (Multipurpose Internet Mail Extensions): Mechanisms for Specifying and Describing the Format of Internet Message Bodies", N. Borenstein et al., IETF 1341, Jun. 1992, pp. 1-88.

"MIME (Multipurpose Internet Mail Extensions) Part One: Mechanisms for Specifying and Describing the Format of Internet Message Bodies", N. Borenstein et al., IETF 1521, Sep. 1993, pp. 1-76.

Open Mobile Alliance "OMA Device Mangaement Notification Initiated Session", Draft Version 1.2, Dec. 15, 2004, retrieved from www.oma.org, whole document.

"SyncML Notification Initiated Session, Version 1.1", Open Alliance, [Online] Feb. 15, 2002, pp. 1-12, XP002462105, Retrieved from the Internet: URL:http//www.openmobilealliance.org/tech/affiliates/syncml/syncml_dm_notification_v11_20020215.pdf>.

* cited by examiner

METHODS AND APPARATUS TO INTEGRATE MOBILE COMMUNICATIONS DEVICE MANAGEMENT WITH WEB BROWSING

TECHNICAL FIELD

This invention relates generally to mobile communications devices and methods and, more specifically, relates to content delivery, web browsers and device software over the air delivery used with wireless communications terminals and appliances.

BACKGROUND

As the amount and complexity of software in mobile communications devices increases there is an increasing need for manufacturers, service providers and software developers to maintain the mobile device configuration and its software components after the manufacturing phase. For example, selling add-on applications or commercial content to users of mobile devices ideally requires compatibility checking and management of the interrelated dependencies of the software modules. While providing generic profile or model information of the device may be sufficient for relatively simple content delivery (e.g., such as a music download), for application installations and particularly for firmware updates it is essential to obtain detailed mobile device information in order to correctly select delivery versions and download packages. In many cases, however, these important details are not known to the user, and/or are not visible to the user through the user interface.

The Open Mobile Alliance (OMA) has standardized a set of service enablers to fulfill the needs of device management and downloads of digital products. However, many of the standards are quite tightly focused on the mobile domain, and thus integrating them as architectural components into a more generic digital delivery system entity is not straightforward.

In many cases the use of digital delivery for mobile devices is e-commerce oriented. As such, in addition to technical level device management tasks there are several user level aspects such as demand creation, menu browsing, selection, commitment and payment.

A natural technology choice, and the current defacto method for implementing the user interface, is through web technologies, particularly HTTP browsing and web applications. Thus, any attempt to address the problems discussed above should ideally be compatible and inter-operate with existing and future web-related technologies, including web browsers.

General reference with respect to updating a user can be made to the following U.S. Patents, all by Richard R. Reisman: U.S. Pat. No. 5,694,546, "System for Automatic Unattended Electronic Information Transport Between a Server and a Client by a Vendor Provided Transport Software with a Manifest List"; U.S. Pat. No. 6,125,388, "System for Transporting Information Objects Between a User Station and Multiple Remote Sources Based upon User Modifiable Object Manifest Stored in the User Station"; U.S. Pat. No. 6,594,692 B1, "Methods for Transacting Electronic Commerce"; and U.S. Pat. No. 6,658,464 B2, "User Station Software that Controls Transport, Storage, and Presentation of Content from a Remote Source".

SUMMARY OF THE PREFERRED EMBODIMENTS

The foregoing and other problems are overcome, and other advantages are realized, in accordance with the presently preferred embodiments of these teachings.

In one aspect this invention provides both a method and a system to automate a device session in combination with a user's interaction with a server. The method includes, in response to receiving a certain type of HTTP request message from the device during a browsing session, sending a HTTP response message to the device. The HTTP response message includes a dedicated MIME-type for indicating that a device management session is being initiated, and the device management session is identified by an identifier that forms part of the HTTP response message. The device replies to the HTTP response message with a device management session reply that comprises device details and the identifier. Using the device details, the system develops a list containing at least one download option that is compatible with the device and sends the list to the user. In response to a user selecting the at least one download option from the list, the system delivers the selected at least one download option to the device during a device management session.

In another aspect this invention provides a method to operate a device to download information via a wireless network, and a device having a controller that operates in accordance with the method. The method includes, during a wireless HTTP session, making an inquiry with the device with regard to downloadable information; in response to the inquiry, initiating a secure device management wireless dialog with the device to obtain device-specific parameters descriptive of at least certain capabilities of the device; generating a list and sending the list to the device, the list comprising at least one entry that is descriptive of downloadable information that is compatible with the device capabilities; and during a wireless HTTP session, selecting at least one entry from the list to be downloaded to the device.

In a further aspect of this invention there is provided a device management server that is operable with a device to download information via a wireless network to the device. The device management server includes a first interface for coupling to the device, a second interface for coupling to a workflow manager and a controller that operates with a program to perform operations that are initiated in response to the device, during a wireless HTTP session, making an inquiry with regard to downloadable information. The device management server is further responsive to the workflow manager initiating a secure device management wireless session with the device to obtain device-specific parameters descriptive of at least certain capabilities of the device; to cooperate with the workflow manager via the second interface to generate a list and to send the list towards the device via the first interface, where the list contains at least one entry that is descriptive of downloadable information that is compatible with the device capabilities; and during a wireless HTTP session, to download information to the device corresponding to at least one entry from the list selected by a user of the device.

In a still further aspect of this invention there is provided a workflow manager operable with a device and with a device management server for downloading information via a wireless network to the device. The workflow manager includes a first interface for coupling to the device via a web site and to the device management server, a second interface for coupling to at least one back-end system, and a controller that operates with a program to perform operations initiated in response to the device, during a wireless HTTP session, making an inquiry to the web site with regard to downloadable information. The workflow manager initiates a secure device management wireless session with the device to obtain device-specific parameters descriptive of at least certain capabilities of the device; and cooperates with the device management server via the first interface and with the at least one back-end system via the second interface to generate the list that is descriptive of downloadable information that is compatible with the device capabilities. The workflow manager further operates to send the list towards the device via the first interface and via the web server.

BRIEF DESCRIPTION OF THE DRAWINGS

The foregoing and other aspects of the teachings in accordance with this invention are made more evident in the following Detailed Description of the Preferred Embodiments, when read in conjunction with the attached Drawing Figures, wherein.

DETAILED DESCRIPTION OF THE PREFERRED EMBODIMENTS

Examples of documents that are descriptive of current web-related technologies of interest to the presently preferred embodiments of this invention include: RFC 2616: Hypertext Transfer Protocol-HTTP1.1, IETF, June 1999; RFC 2109: HTTP State Management Mechanism; IETF, February 1997; and SyncML Device Management Protocol, Version 1.1.2 (OMA-SyncML-DMProtocol-V1_1_2-20030612-C), Open Mobile Alliance, June 2003.

In order to ensure a pleasant user experience during a digital delivery transaction, the inventors have realized that the detailed level device information gathering and management procedures should be automated and seamlessly integrated with the digital delivery transaction. In the preferred embodiments of this invention a model is used that utilizes OMA service enablers, preferably OMA Device Management and OMA Download, as integrated sub-components in a web browsing-based digital delivery transaction. The use of the presently preferred embodiments of this invention is particularly beneficial for the firmware update use case, but may be applied to benefit other digital delivery applications as well.

For the purposes of this invention "firmware" may be considered to comprise computer code written in a relatively low level language that is executable either directly or indirectly (e.g., after being run through a compiler or an interpreter) by a data processor that forms part of the device 10. An example of firmware, or a firmware upgrade, could be a revision to, as non-limiting examples, an operating system module, an http protocol stack implementation, or an improvement to a wireless network access and/or scanning procedure necessitated by, or made optional in view of, a change to an underlying communications standard. In contradistinction, an "application" may be considered a higher level program that imparts a new, and possibly optional, functionality to the device 10, such as an improved or different Internet browser, or a media player, or an image capture program that provides for archiving captured images (assuming that the device 10 includes a digital camera) to some network-provided image database. As can be appreciated, the specifics of the device 10 construction and operation, such as the revision level of its operating system software, the amount of installed memory, the type (e.g., model number) of its digital camera and other types of parameters can have a significant influence on the type and/or revision level of the firmware or application software that is downloaded to the device 10. As but one example, the user may desire to download firmware or an application that is incompatible with the hardware of the device 10, or that requires more memory than the device 10 has installed, or that assumes an operating system version that was released subsequent to the manufacture date of the device 10. In any of these cases simply downloading the user-requested firmware or application could create significant problems for the user, and a less than optimum user experience with the web site 30, which may be associated with the manufacturer of the device 10, or with a network operator with whom the user 1 has a subscription. One motivating factor for this invention is to avoid such problems, and to do so with a minimal impact on the user. It is a desirable goal to provide the user with an optimal experience for both user-interactive and non-user-interactive (e.g., background) type of operations.

It should be appreciated at the outset that while the preferred and exemplary embodiments of this invention discussed below are presented in the OMA framework, this invention is not limited for use only with OMA-based enablers and technology.

Figure 1:
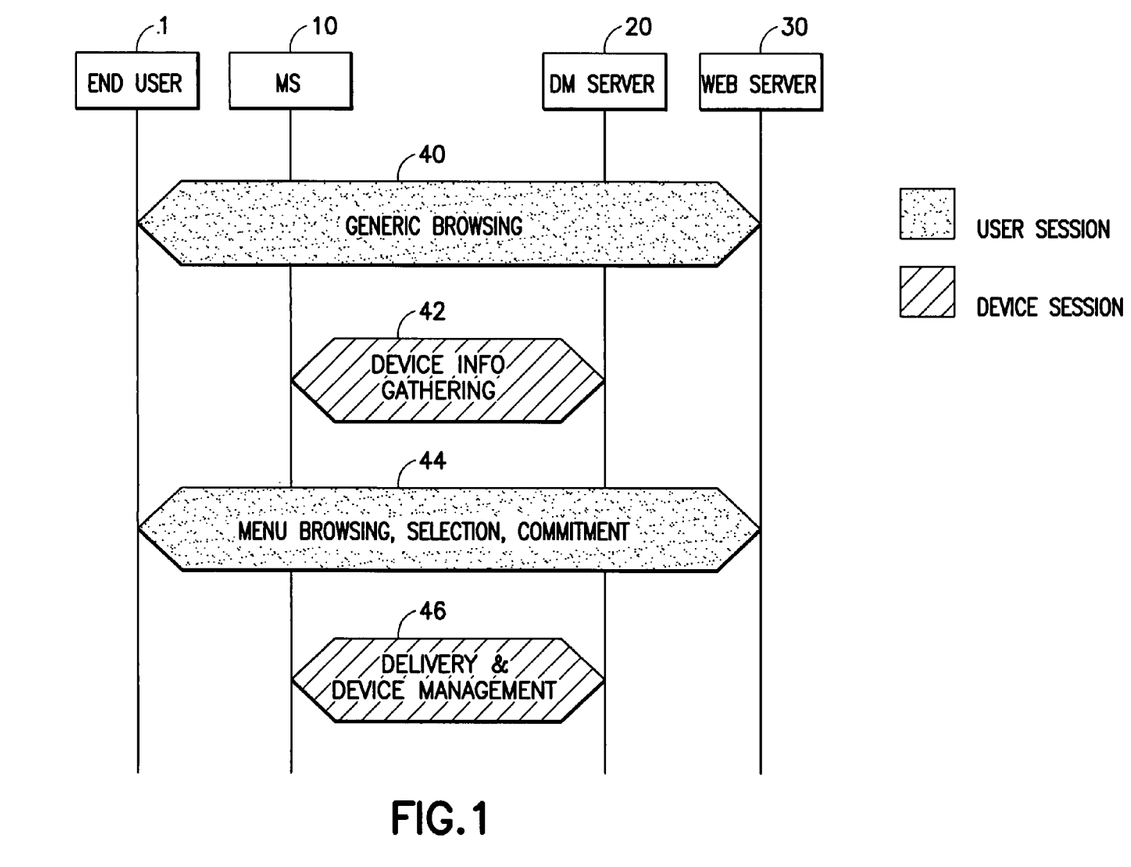
FIG. 1 is logical level sequence diagram of a typical sequence for digital delivery as part of an e-commerce oriented use case.

By way of introduction, a typical sequence for digital delivery as part of an e-commerce -oriented use case is illustrated in FIG. 1 in the form of a logical level sequence diagram. FIG. 1 shows an end user 1 associated with a mobile station (MS) 10, a DM server 20 and a web server 30. A user session is assumed to exist between the end user 1 and the web server 30, while a device session exists between the MS 10 and the DM server 20. FIG. 1 is useful in explaining the problems that arise in a conventional digital delivery session to a MS 10, and thus aids in providing an enhanced understanding of the improvements provided by the preferred embodiments of this invention.

It should be noted through that the teachings of this invention are applicable to a number of user interface technologies, are not limited to only web-interface technologies. As non-limiting examples, the teachings of this invention are also applicable to Wireless Application Protocol (WAP) technologies, and to JAVA™ based applications.

With regard to FIG. 1, it may be assumed that as the successful result of successful marketing and according to web link information the user 1 has arrived at the web site 30 which has downloadable items available for mobile stations. This interaction is shown as the generic browsing 40. To ensure that the alternatives presented to the user 1 are actually compatible with and functional in the user's MS 10, the server-side system needs to know the capabilities of the MS 10. A conventional manual procedure to accomplish this would be to restrict the spectrum of digital product variances according to a range of MS 10 models and, as a starting point for the user interaction, prompt the user 1 for the MS 10 model information. However, there are number of disadvantages inherent in this conventional approach. As a few examples, and first, this approach can result in a bad user experience, as the user 1 is prompted to perform a mundane data entry task. Further, unless the instructions to the user are perfectly clear, the user 1 may abandon the web server 30 and go elsewhere for the desired digital delivery. Second, the information reliability can be compromised by requiring the user 1 to enter the information. As may be appreciated, in some cases the correctness of the device information is very critical for a successful delivery (and particularly for a successful activation of a delivered application or firmware). Third, and related to the first two issues, the complexity of the information required may be such that the user 1 does not know the information, and may not be able to retrieve it using the conventional user interface of the MS 10.

In addition to the user session 40, a separate device session 42 is used to gather sufficient device information to create a menu of alternative downloadable items for the user 1. This menu may shown in a web-based user session 44, where user 1 can browse through the menu, read additional information, select and commit to a delivery. Finally, and according to the user 1 selection(s), the delivery and related device management tasks are completed through a second device session 46.

The inventors have realized that a problem that arises in the exemplary scenario depicted in FIG. 1 is how to best combine the two different sessions (user session and device session) and transfer data between them. For example, after the user 1 has arrived at the web server 30 by using a web browser, and desires that a list of relevant items be shown, what is the best way to begin an OMA device management session to obtain the device (MS 10) capability and compatibility information? Further, and assuming that this automatic information gathering can be completed, what is the best technique to return the results in the web session to the user's browser? In other words, what is the most opportune manner in which to integrate or bootstrap an OMA DM session with the user's web browsing session?

In order to gain a fuller understanding of the underlying problems that are inherent in providing an integrated user browser and OMA DM session, a brief discussion is now provided of some pertinent basic fundamentals of web technologies (in the context of HTTP), and also OMA device management.

HTTP is the simple and powerful network protocol of the web. It is usually implemented on top of Transport Control Protocol/Internet Protocol (TCP/IP) sockets to transfer resources (files, application output) from a HTTP server (usually a web server) to a HTTP client (such as a web browser).

Originally, the concept of a web session did not exist in HTTP, as HTTP is a stateless protocol; i.e., it has two messages, request and response, and includes alternative methods: GET, POST and HEAD. In the original sense, a HTTP "session" starts when the request message is sent, and the HTTP session ends when the response message is received.

At first, the underlying TCP/IP session was closed after each pair of request-response messages. However, as web technology progressed and became more widely used the size and complexity of web pages increased dramatically, leading to the typical currently viewed web pages with tens or hundreds of separate HTTP resources (such as flashing GIF icons, blinking banners, and animated thumbnail advertisements). As a result of this increase in HTTP web page complexity the computing resource expense, at both the client and at the server, to open and close down a dedicated TCP/IP socket for each HTTP request became too great. In response, protocol specialists standardized (in HTTP 1.1) a technique to use a persistent TCP/IP connection. However, even with the persistent TCP/IP socket in place it is not possible for the server to send a response message towards the client without a preceding HTTP request message. Stated another way, a web server cannot push information to a browser (see RFC 2616: Hypertext Transfer Protocol-HTTP/1.1, IETF, June 1999).

Notwithstanding the stateless orientation of HTTP, the need for web sessions quickly became apparent as more web applications appeared. The HTTP state management mechanism (see RFC 2109: HTTP State Management Mechanism; IETF, February 1997) provides the web application developer with features on top of HTTP to combine several HTTP messages into one specific user session. An implementation includes cookies, which carry user and session related information in all of the messages from the client to the server. The server typically encrypts the cookie to prevent a fraudulent client from tampering with its content.

Turning now to OMA DM, and as the full name for OMA DM indicates, the SyncML Device Management Protocol utilizes SyncML in the device management domain. This is a client-server protocol for implementation in a DM client and in a DM server.

A DM client includes a management tree, which is a tree-formed data structure containing manageable objects. To carry out the required device management tasks a DM server uses commands such as Get, Replace and Exec that are targeted to the objects in the management tree.

OMA DM is optimized for interactions between a server and a device, such as the MS 10 of FIG. 1. For user interactions there are simple commands to implement features such as notifications and user choices, but in general the user interface capabilities of OMA DM are very limited.

Prior to an OMA device management session being established a device should be "bootstrapped". The SyncML Device Management Protocol standard defines two methods for bootstrapping:

(a) Customized bootstrap, where devices are loaded with SyncML DM bootstrap information at manufacture (also referred to as a factory bootstrap); and (b) Server initiated bootstrap, where a server sends out bootstrap information via some push mechanism, e.g. WAP Push or OBEX. In this method the server must be informed of the device address/phone number beforehand. During the bootstrapping procedure a number of parameters are set in the device, including the server address and identification, as well as both client and server-related authentication information. While the presently preferred embodiments of this invention prefer to use the factory bootstrap procedure, the server-initiated bootstrap procedure may be used as well.

Having thus described the HTTP and OMA DM environments that are most germane to the presently preferred (but non-limiting) embodiments of this invention, a description is now provided of the presently preferred embodiments of methods and apparatus in accordance with this invention.

Salient aspects of this invention include the use of a dedicated MIME-type in a HTTP response message to launch the OMA DM session and to send bootstrapping parameters to the device; the encryption with a secret key of the bootstrapping information in a client provisioning message (notification may be used in lieu of bootstrapping); and the use of an upper layer digital delivery session and its identification to combine a web session and device session(s) into one overall logical transaction. A further aspect of this invention relates to a procedure to return control to the web session after the device session by use of a queued HTTP request; an OMA DM Exec command to a web browser object with a pre-defined URL; and a user response to a previously sent activation prompt.

More specifically, what is implied by this further aspect of the invention is the following:

1. A Queued HTTP Request

As a reaction to the HTTP response (message (g) of FIG. 2, discussed below), and in addition to the DM session establishment (message (h) of FIG. 2, discussed below), the device 10 creates an HTTP request to the web server 30. The web server 30 queues the request until it receives a user options message (message (o) of FIG. 2, discussed below), and then sends the response to the browser 10B (message (p) in FIG. 2, discussed below).

2. OMA DM Exec

After creating the menu (activity (n) in FIG. 2, discussed below), a workflow manager 50 requests the DM server 20 to send an Exec command to device 10 DM Client 10A, and in this manner requests that the device's web browser 10B become active and send an HTTP request to the web server 30. The web server 30 responds to this HTTP request by sending the options (message (o) of FIG. 2, discussed below) to web browser 10B in the HTTP response (message (p) in FIG. 2, discussed below).

3. User Response to Activation Prompt.

As part of the HTTP response (message (g) in FIG. 2, discussed below), there also exists user interface information to be presented in web browser 10B. This user interface activity includes presenting a prompt for the user (e.g. "please wait, device information being gathered") and a submit (e.g., "ok") button. When the user accepts the information (e.g., by pressing the "ok" button) the web browser 10B sends a HTTP request to web browser 30. This request will then be handled as in alternative 1 (as a queued HTTP request).

In general, MIME was originally intended to extend the format of Internet mail to allow non-US-ASCII textual messages, non-textual messages, multi-part message bodies and non-US-ASCII information in message headers. The following RFCs define MIME: RFC 2045: MIME Part One: Format of Internet Message Bodies; RFC 2046: MIME Part Two: Media Types; RFC 2047: MIME Part Three: Message Header Extensions for Non-ASCII Text; RFC 2048: MIME Part Four: Registration Procedures; and RFC 2049: MIME Part Five: Conformance Criteria and Examples. Reference can also be had to RFC 1341 (June 1992), which was obsoleted by RFC 1521: MIME (Multipurpose Internet Mail Extensions) Part One: Mechanisms for Specifying and Describing the Format of Internet Message Bodies (September 1993); and RFC 1342: MIME (Multipurpose Internet Mail Extensions) Part Two: Message Header Extensions for Non-ASCII Text (September 1993).

Figures 2, 2A:
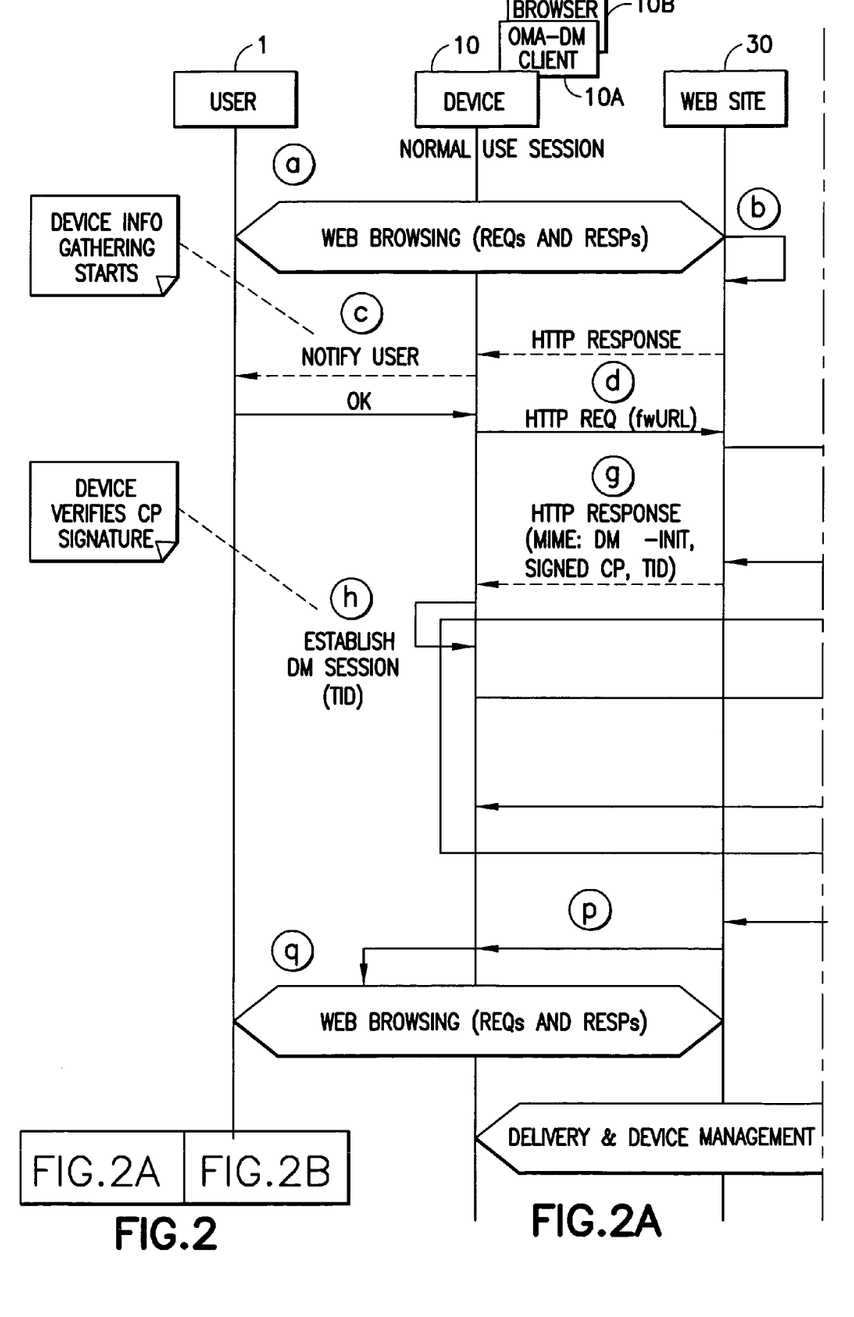
FIG. 2 is a message flow sequence diagram for the exemplary case of a firmware update that takes place with a device in accordance with preferred embodiments the invention.
Figure 2B:
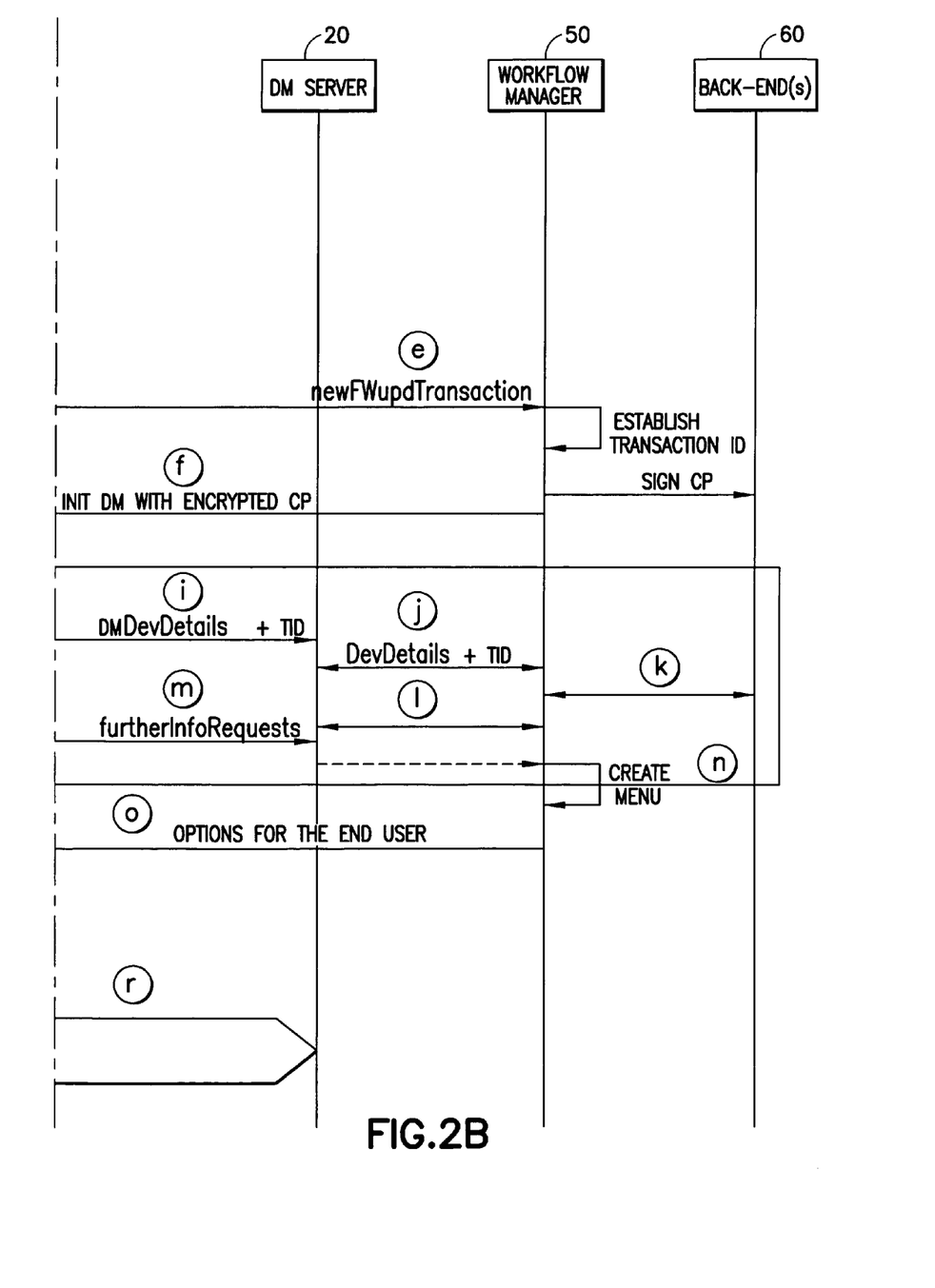

A system description is now provided with respect to the embodiment of FIG. 2, which shows the signal and message flow between the user 1, the device, such as the MS 10 of FIG. 1, the web site (or web server) 30, the DM server 20, the above-mentioned workflow manager 50 and one or more back-end systems 60. The capabilities and responsibilities of these various components, which may also be referred to herein as actors, is described below, followed by a description of the usage sequence depicted in FIG. 2.

It should be noted that in a presently preferred embodiment of this invention, but by no means as a limitation upon the practice of this invention, the link between the device 10 and the web site 30 is carried at least partially though a wireless link, such as a cellular RF link, or a Bluetooth link, or a wireless local area network (WLAN) link, or through an optical link, possibly via a network provider (e.g., via a cellular network operator, or a WLAN hotspot operator) of the device 10.

For the purposes of the description of the presently preferred embodiments of this invention, and not as a limitation upon the practice of this invention, the user 1 is a human being that uses the device 10. The user 1 may be interested in (possibly commercial) digital products available in the network, such as content, applications and/or firmware updates. Web browser is the preferred application to discover, select and commit to delivery of a digital product. The user 1 does not necessarily own the device 10.

For the purposes of the description of the presently preferred embodiments of this invention, and not as a limitation upon the practice of this invention, the device 10 is or includes a mobile component having an instance of an OMA DM client application implementation 10A and a HTTP 1.1 compliant web browser 10B. For firmware updates the device 10 may have, as an exemplary and non-limiting example, OMA Firmware Over the Air (FOTA) capability. The device 10 may be, as exemplary and non-limiting embodiments, a cellular or a non-cellular telephone, or a computer having a wireless interface (RF and/or IR) with a local and/or a wide area network (LAN and/or WAN), or a personal digital assistant (PDA) having a wireless interface (RF and/or IR) with a LAN and/or a WAN, or any suitable Internet appliance enabling the user 1 to operate a browser to contact the web server or site 30. This being the case, the device 10 will typically comprise a wireless (RF or optical) transceiver.

Figure 3:
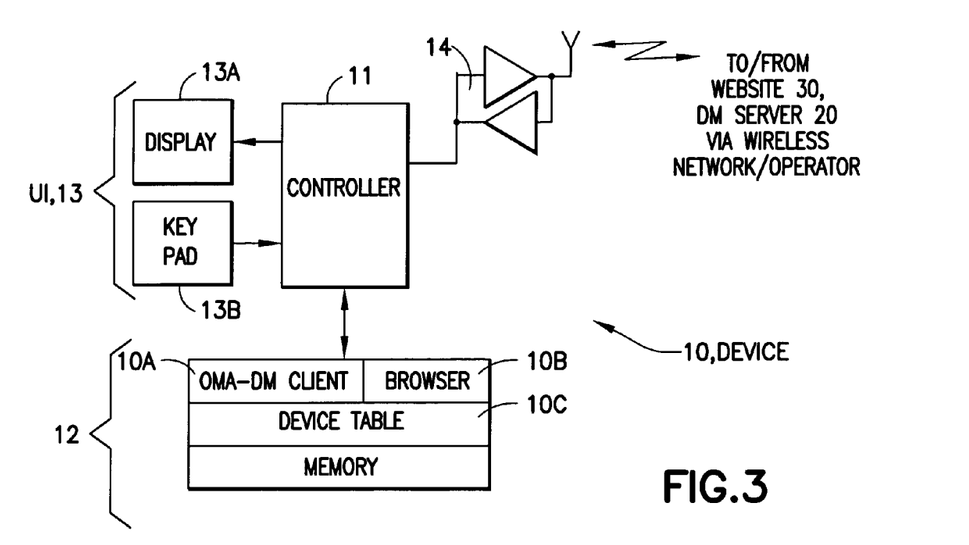
FIG. 3 is a block diagram of a device suitable for use in the message flow sequence of FIG. 2.

Reference is made to FIG. 3 for showing a non-limiting example of a block diagram of the device 10 that is suitable for use in the message flow sequence of FIG. 2. Device 10 is assumed to include a controller 1, such as a microprocessor, that is coupled to memory 12 that stores, in addition to an operating system and other typical software, software for implementing the OMA-DM client 10A in accordance with this invention, as well as a web browser 10B. Also found in the memory 12 may be a device table 10C that stores device details (e.g., hardware capabilities, operating system version, memory capacity) that were loaded upon manufacture, or when the device was first activated. Also provided is a user interface (UI) 13, or an interface to a suitable UI. In one non-limiting embodiment the UI 13 includes a user display (e.g., a LCD display) 13A and a keyboard or keypad 13B user data entry device. The controller 11 is also coupled to a suitable RF or optical transceiver 14 for communication with the website 30 and the DM Server 20, typically via a wireless network/operator, such as a cellular telephone network operator, or a Wireless LAN network. Note that in a wired embodiment of the device 10 the transceiver 14 may be coupled to an electrical or optical cable or other wiring.

For the purposes of the description of the presently preferred embodiments of this invention, and not as a limitation upon the practice of this invention, the web site 30 contains or is linked to a HTTP 1.1-compliant web server that implements the user interface (HTML pages) towards the user 1. The web site 30 preferably has an Application Program Interface (API) to implement web applications, and an interface towards other server side components (e.g., 20, 50, 60).

For the purposes of the description of the presently preferred embodiments of this invention, and not as a limitation upon the practice of this invention, the DM server 20 implements an OMA SyncML DM protocol stack, communicates with the DM client 10A in the device 10, and has interfaces to other server-side components (30, 50, 60). Reference with regard to SyncML can be had to, as examples, SyncML Device Management Protocol, Version 1.1.2 (OMA-SyncML-DMProtocol-V1_1_2-20030612-C, Open Mobile Alliance, June 2003, as well as to SyncML Device Information DTD, version 1.1, February 2002 (where DTD represents Document Type Definition)).

Figure 4:
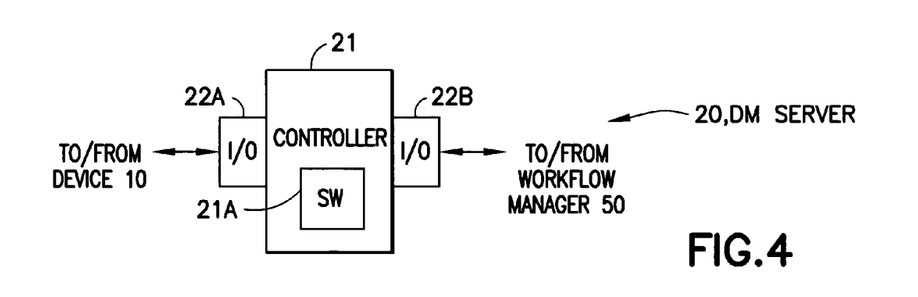
FIG. 4 is a block diagram of a DM server suitable for use in the message flow sequence of FIG. 2.

Reference is made to FIG. 4 for showing a non-limiting example of a block diagram of the DM server 20 that is suitable for use in the message flow sequence of FIG. 2. DM server 20 is assumed to include a controller 21, such as a microprocessor, that is coupled to a memory 21A that stores, in addition to an operating system and other typical software (SW), software for implementing the OMA SyncML DM protocol stack and software for communicating with the OMA-DM client 10A of the device 10. The DM server 20 includes input and output interfaces (I/Os) 22A and 22B (which may be logical and/or physical I/Os) for communication with the device 10 and the workflow manager 50. Note that both I/O interfaces 22A, 22B may be embodied as logical interfaces that communicate via TCP/IP over the Internet.

For the purposes of the description of the presently preferred embodiments of this invention, and not as a limitation upon the practice of this invention, the workflow manager 50 keeps track of the overall digital delivery process, e.g., a firmware update transaction. The workflow manager 50 creates a unique transaction identification (TID), uses the web server 30 and DM server 20 as interfaces to the user 1 and the device 10, and combines the individual lower level sessions into one logical transaction. The workflow manager 50 preferably uses the services in the back-end systems 60 to complete certain specific tasks during the transaction with the device 10.

Figure 5:
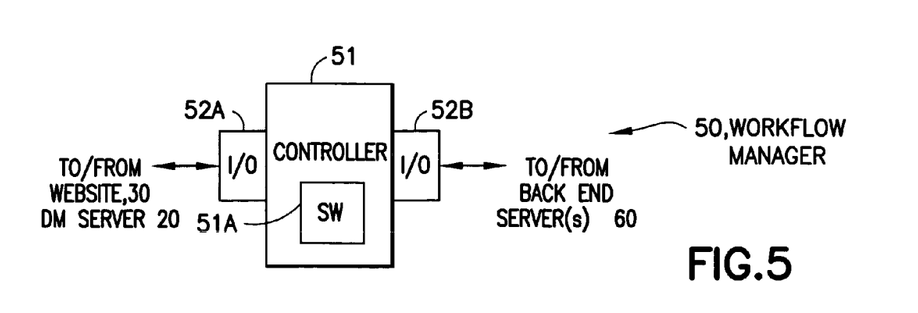
FIG. 5 is a block diagram of a workflow manager suitable for use in the message flow sequence of FIG. 2.

Reference is made to FIG. 5 for showing a non-limiting example of a block diagram of the workflow manager 50 that is suitable for use in the message flow sequence of FIG. 2. Workflow manager 50 is assumed to include a controller 51, such as a microprocessor, that is coupled to a memory 51A that stores, in addition to an operating system and other typical software (SW), software for generating the TID and for managing and correlating the various transactions with the device 10 and other system components. The workflow manager 50 I/Os 52A and 52B (which may be logical and/or physical I/Os) for communication with the web site 30, the DM server 20, and the back-end server(s) and system(s) 60. As with the DM server 20, both I/O interfaces 52A, 52B may be embodied as logical interfaces that communicate via TCP/IP over the Internet.

For the purposes of the description of the presently preferred embodiments of this invention, and not as a limitation upon the practice of this invention, the back-end server(s) and system(s) 60 provide services for the workflow manager 50. The services may include, but are not restricted to, security services for authentications, encryptions and signatures, device 10-related services such as legal and warranty status information, as well as detailed product management services, such as Product Data Management (PDM) information.

For the purposes of the description of the presently preferred embodiments of this invention, and not as a limitation upon the practice of this invention, the workflow manager 50 and the back-end system(s) 60 are controlled by the same entity that controls the web site 30 and the DM server 20. However, this is not a limitation upon the practice of this invention, and one or both of these components may be under the control of third parties. For example, one of the back-end systems 60 may be a third party digital signature authenticator, or a third party digital payment facilitator.

Turning now to the exemplary sequence diagram shown in FIG. 2, the following steps are executed in accordance with the embodiments of this invention. At (a) the user 1 browses through competing web sites and finds a desired vendor's firmware (FW) update pages. At (b) the user 1 clicks a link in a FW update page to determine which new FW update alternatives (if any) are available for the device 10. At (c) the web site 30 sends a page to the user 1, via the device 10, and the HTTP response is used to inform the user 1 via the device 10 that automated device information gathering is about to start. A suitable message may be: "Wait while we retrieve the requested firmware for your phone". At (d) the user 1 accepts, via the user interface of the device 10, the automated device session establishment, which results in a HTTP request being sent from the browser 10B to the web server 30. At (e) the web server 30 informs the workflow manager 50 that there is a user request to start a firmware update transaction (FWupdTransaction) and to establish an OMA DM session. In response, the workflow manager 50 creates a new transaction with a unique TID. At (f), and with the assistance of the back-end services 60, the workflow manager 50 creates a suitable OMA client provisioning (CP) message and signs it with the secret key. An INIT DM message is sent to the web site 30 with the encrypted CP. At (g), and as part of the HTTP response, the web site 10 sends the signed CP message, with a MIME-type dedicated to OMA device management, to the device 10. The TID is embedded in the HTTP response message. Based on the MIME-type information and the signed CP message, at step (h) the device 10 checks the validity of the DM bootstrapping information, sets the parameters accordingly, and launches the OMA DM client application 10A. At (i) the OMA DM client 10A establishes an OMA DM session and sends device 10 information details to the DM server 20. These device details may be stored in the table 10C in the memory 12 of the device 10, and may have been loaded upon manufacture, or when the device was first activated. In any case, the user 1 need not be aware of the device 10 information, as this step (i) preferably occurs automatically, and without involvement of the user 1. The TID is preferably included as a part of this information that is sent back to the DM server 20. At (j) the DM server sends the TID and the received device information to the workflow manager 50, and at (k) the workflow manager 50 communicates with the back-end services 60 to determine whether the amount and level of details in device 10 information is sufficient to create a list of alternatives (a menu of firmware download options). If there is a need for more detailed and specific device 10 information, at (l) the workflow manager 50 requests the DM server 20 to fetch the relevant data from the device 10. In this case at (m), and by using the OMA DM protocol, the DM server 20 obtains the additional device 10 information and sends it back to the workflow manager 50. At (n) the workflow manager 50 creates (or uses one or more back-end services 60 to create) a list of available alternatives, i.e., a menu of firmware download options for the end user 1. At (o) the workflow manager 50 sends the menu of firmware download options to the web site 30, and at (p) the web site 30 returns the menu to the browser 10B for the user 1 to select products or request more (web-formalized) information. This can be accomplished at (p) via at least three techniques: a previously queued HTTP request; an OMA DM exec to web object; or a user action in a previously sent web page. By whatever technique is used at (p), additional web browsing, involving HTTP requests and responses (user 1 via device 10 with the web site 30), and eventual delivery of the requested firmware and device management (device 10 and DM server 20), occurs at steps (q) and (r), respectively. Note that any suitable technology and mechanism can be used for the actual download of the firmware to the device 10.

Figure 6:
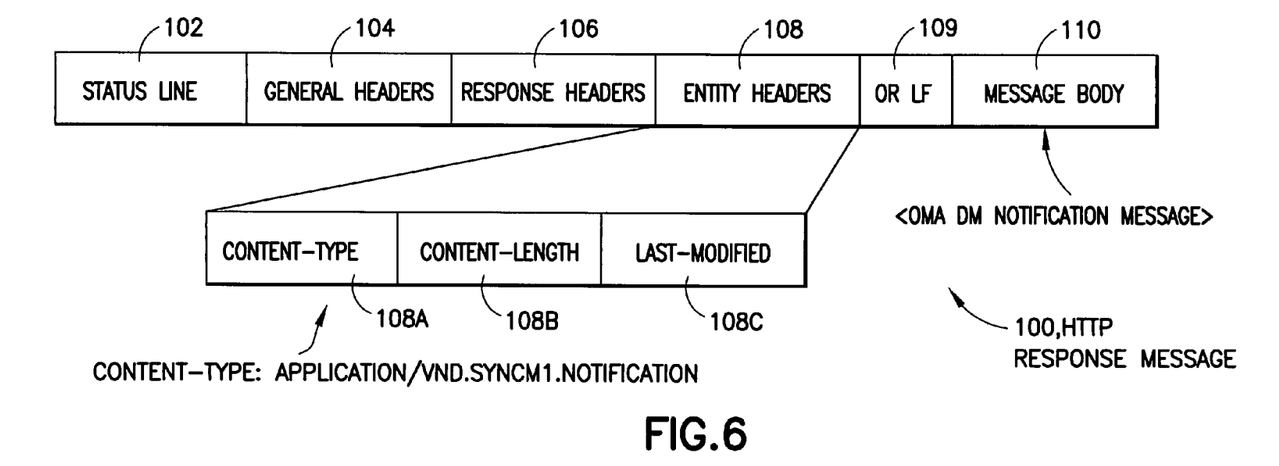
FIG. 6 shows a non-limiting example of the structure of a HTTP Response message that carries a Device Management notification message in accordance with an aspect of the teachings of this invention.

An aspect of combining a web session with an automated DM session, in accordance with embodiments of this invention, involves conveying the OMA DM notification message within an HTTP response message (message (g) in FIG. 2). Referring to FIG. 6, the HTTP response message generally contains a Status Line field 102, a General Headers field 104, a Response Headers field 106, an Entity Headers field 108, a delimiter or separator, shown as a carriage return/line feed (CRLF) 109, and a Message Body field 110. Of most interest to the non-limiting embodiments of this invention is the Entity Headers field 108, that contains a Content-Type field 108A, a Content-Length field 108B and a Last-Modified field 108C. Of particular interest is the Content-Type field 108A that conveys the above-mentioned predetermined MIME-type. As non-limiting examples, the predetermined MIME-type for a General Notification Initiated Session Alert message may be Content-type 108A: "application/vnd.syncml.notification", and the Content-Type code may be 0x44.

In a presently preferred, but non-limiting embodiment of the structure of the HTTP response message illustrated in FIG. 6, the OMA DM notification is carried in the Message-Body field 110.

An exemplary HTTP response message content may be as follows:

```
Response = Status-Line (102 in FIG. 6)
    *(( general-header (104 in FIG. 6)
    | response-header (106 in FIG. 6)
    | entity-header (108 in FIG. 6) ) CRLF)
    CRLF (109 in FIG. 6)
    [ message-body ] (110 in FIG. 6)
status-line = HTTP/1.1 <Space> status-code+reason-phrase
status-code+reason-phrase = 200 <Space> OK |
            400 <Space> Bad Request |
            404 <Space> Not Found |
            500 <Space> Internal Server Error |
            501 <Space> Not Implemented
general-header = Date: <Space> date <CRLF>
            Connection: <Space> close <CRLF>
response-header = Server: <Space> vendor-string <CRLF>
entity-header = Content-Length: <Space> integer-greater-or-equal-0
<CRLF>
            Content-Type: <Space> text/html <CRLF>
            Last-Modified: <Space> date <CRLF>
            [ Cache-Control: <Space> no-cache <CRLF> ] // only for
            dynamic pages
            [ Expires: <Space> date <CRLF> ]   // only for dynamic
            pages
message-body = // the contents of the document requested by the client
date = // date format according to RFC822 and RFC1123
vendor-string = // server identification
            // (freely definable by the server implementor)
```

Figure 7:
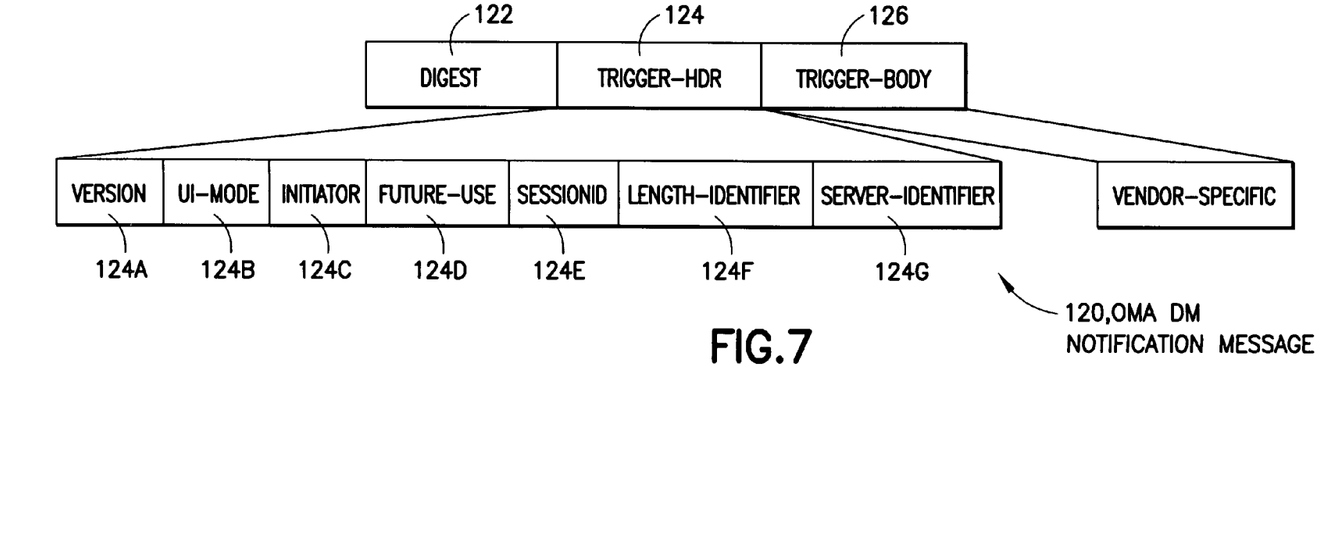
FIG. 7 shows a non-limiting example of the structure of the Device Management notification message that is carried by the HTTP Response message of FIG. 6.

The fields of an exemplary embodiment of the OMA DM notification message 120 are shown in FIG. 7, where:

| Field | Description |
|---|---|
| digest 122 | MD5 Digest value |
| trigger-hdr 124, containing: | |
| version 124A | Device Management Version |
| ui-mode 124B | not-specified/user-interaction |
| initiator 124C | Server/User initiated (client/server) |
| future-use 124D | reserved for future DM use |
| sessionid 124E | Session identifier |
| length-identifier 124F | Server Identifier length |
| server-identifier 124G | Server Identifier |
| trigger body 126 | vendor-specific |

One non-limiting example of a DM Device Details message (message (i) in FIG. 2) is shown below (reference may be had again to: SyncML Device Management Protocol, Version 1.1.2 (OMA-SyncML-DMProtocol-V1_1_2-20030612-C), Open Mobile Alliance, June 2003):

```
<SyncML xmlns='SYNCML:SYNCML1.1'>
    <SyncHdr>
        <VerDTD>1.1</VerDTD>
        <VerProto>DM/1.1</VerProto>
        <SessionID>1</SessionID>
        <MsgID>1</MsgID>
        <Target>
            <LocURI>http://XXXX/mgmt-server</LocURI>
        </Target>
        <Source>
            <LocURI>IMEI:XXXX</LocURI>
        </Source>
        <Cred> <!-- Client credentials -->
            <Meta>
                <Type xmlns="syncml:metinf">syncml:auth-basic</Type>
                <Format xmlns-'syncml:metinf'>b64</Format>
            </Meta>
            <Data>
                <!—base64 formatting of userid:password -->
            </Data>
        </Cred>
        <Meta> <!-- Maximum message size for the client -->
            <MaxMsgSize xmlns="syncml:metinf">5000</MaxMsgSize>
        </Meta>
    </SyncHdr>
    <SyncBody>
        <Alert>
```

-continued

```
        <CmdID>1</CmdID>
        <Data>1200</Data> <! -- Server-initiated session -->
        <Item></Item>
        <Item>
            <Data>123 blah blah</Data> <! -- one example of sending TID -->
        </Item>
    </Alert>
    <Alert>
        <CmdID>XXX</CmdID>
        <Data>TIDXXXX 123 blah blah </Data> <! -- or alternative way of sending
        TID -->
    </Alert>
    <Replace>
        <CmdID>3</CmdID>
        <Item>
            <Source><LocURI>./DevInfo/DevId</LocURI></Source>
            <Meta>
                <Format xmlns='syncml:metinf'>chr</Format>
                <Type xmlns='syncml:metinf'>text/plain</Type>
            </Meta>
            <Data>abc blah blah 123 blah blah</Data>
        </Item>
        <Item>
            <Source><LocURI>./DevInfo/Man</LocURI></Source>
            <Meta>
                <Format xmlns='syncml:metinf'>chr</Format>
                <Type xmlns='syncml:metinf'>text/plain</Type>
            </Meta>
            <Data>BEST MANUFACTURER Inc.</Data>
        </Item>
        <Item>
            <Source><LocURI>./DevInfo/Mod</LocURI></Source>
            <Meta>
                <Format xmlns='syncml:metinf'>chr</Format>
                <Type xmlns='syncml:metinf'>text/plain</Type>
            </Meta>
            <Data>BEST PHONE 2004</Data>
        </Item>
        <Item>
            <Source><LocURI>./DevInfo/DmV</LocURI></Source>
            <Meta>
                <Format xmlns='syncml:metinf'>chr</Format>
                <Type xmlns='syncml:metinf'>text/plain</Type>
            </Meta>
            <Data>123 blah abc blah</Data>
        </Item>
        <Item>
            <Source><LocURI>./DevInfo/Lang</LocURI></Source>
            <Meta>
                <Format xmlns='syncml:metinf'>chr</Format>
                <Type xmlns='syncml:metinf'>text/plain</Type>
            </Meta>
            <Data>blah blah</Data>
        </Item>
    </Replace>
    <Final/>
</SyncBody>
</SyncML>
```

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent download scenarios, application program and firmware download technologies (e.g., firmware downloads may use other than OMA FOTA technology), messaging types and device management protocols and methods may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
    transmitting a certain type of hypertext transfer protocol request message from a device during a first type of session and in response, receiving a certain type of hypertext transfer protocol response message, the certain type of hypertext transfer protocol response message comprising a dedicated multipurpose internet mail extensions type indicating that a second type of session is being initiated, the second type of session being a different type of session from the first type of session, the second type of session being identified by an identifier embedded in the certain type of hypertext transfer protocol response message, where the first type of session is used for communication between a web server and a web browser running on the device and the second type of session is used for communication between a device management server that is connected to the web server and a device management client running on the device, and where the first type of session uses a first protocol and the second type of session uses a second, different client-server protocol;

in response to receiving the certain type of hypertext transfer protocol response message, transmitting in the second type of session a device management session reply that comprises device details and the identifier, where the device details comprise at least one of a device identifier and a firmware identifier;

receiving in the first type of session a list at the device, the list comprising at least one download option that is descriptive of downloadable information that is compatible with the device details; and in response to selecting the at least one download option from the list, receiving downloadable information described by the selected at least one download option at the device during the second type of session.

2. A method as in claim 1, where the certain type of hypertext transfer protocol response message comprises an encrypted client provisioning message.

3. A method as in claim 2, where the certain type of hypertext transfer protocol request message triggers a transaction with a workflow manager that establishes the identifier, where the workflow manager creates the client provisioning message and encrypts it with a secret key.

4. A method as in claim 1, where the list is received at the device using the first type of session.

5. A method as in claim 1, where the device comprises a unit having a wireless transceiver configured to communicate with a web server, and where the delivered downloadable information comprises an application program.

6. A method as in claim 1, where the device comprises a unit having a wireless transceiver configured to communicate with a web server, and where the delivered downloadable information comprises firmware.

7. A system comprising:

a device and a web server coupled together via a wireless link:

the web server being configured to send, in response to receiving a certain type of hypertext transfer protocol request message from the device during a first type of session, a certain type of hypertext transfer protocol response message towards the device, the hypertext transfer protocol response message comprising a dedicated multipurpose internet mail extensions type indicating that a second type of session is being initiated, the second type of session being identified by an identifier embedded in the hypertext transfer protocol response message;

said device comprising a device management client configured to reply in the second type of session to the certain type of hypertext transfer protocol response message with a device management session reply that comprises device details and the identifier, where the device details comprise at least one of a device identifier and a firmware identifier;

where said device management server is configured to use the device details, in cooperation with a workflow manager, to develop a list comprising at least one download option that is descriptive of downloadable information that is compatible with the device details, the web server is configured to send the generated list to the device; and in response to a user selecting the at least one download option from the list, said device management server is configured to deliver downloadable information described by the selected at least one download option to the device during a second type of session.

8. A system as in claim 7, where the certain type of hypertext transfer protocol response message comprises an encrypted client provisioning message.

9. A system as in claim 8, where the certain type of hypertext transfer protocol request message triggers a transaction with said workflow manager that establishes the identifier, where the workflow manager creates the client provisioning message and encrypts it with a secret key.

10. A system as in claim 9, where said workflow manager comprises an interface with at least one back-end system, and where the client provisioning message is encrypted in cooperation with at least one back-end system.

11. A system as in claim 7, where the list is sent to the device using the first type of session and hypertext transfer protocol protocols.

12. A system as in claim 7, where the device comprises a wireless transceiver configured to communicate with the web server, and where the delivered downloadable information comprises an application program.

13. A system as in claim 7, where the device comprises a wireless transceiver configured to communicate with the web server, and where the delivered downloadable information comprises firmware.

14. A system as in claim 7, where the device comprises a communications unit having a wireless transceiver configured to communicate with the web server, and where the delivered downloadable information comprises a program.

15. A method comprising:

during a first type of session using a first protocol, receiving an inquiry from a device with regard to downloadable information;

in response to the inquiry, initiating a secure device management wireless dialogue using a second, different client-server protocol with the device to obtain device-specific parameters descriptive of at least certain capabilities of the device, where the device-specific parameters comprise at least one of a device identifier and a firmware identifier;

generating a list and sending the list to the device, the list comprising at least one entry that is descriptive of downloadable information that is compatible with the device capabilities; and during the first type of session, in response to a selection of at least one entry from the list, downloading in the second type of session the downloadable information to the device corresponding to the selected at least one entry, where initiating the secure device management wireless dialogue with the device uses a hypertext transfer protocol response message that is transmitted in the first type of session and comprises a predetermined multipurpose internet mail extensions type indicating that a second type of session is being initiated, the second type of session being identified by an identifier embedded in the hypertext transfer protocol response message.

16. A device comprising a user interface and a controller configured to operate with a program to perform operations:

during a first type of session using a first protocol to send an inquiry with regard to downloadable information;

in response to receiving a response to the inquiry through a wireless network, to establish a secure second type of session that is a different type of session from the first type of session, using a second, different client-server protocol to send device-specific parameters descriptive of at least certain capabilities of the device, where the device-specific parameters comprise at least one of a device identifier and a firmware identifier;

to receive in the first type of session a list having at least one entry that is descriptive of downloadable information that is compatible with the device capabilities;

to receive in the second type of session downloadable information corresponding to at least one entry from the list, where establishment of the second type of session is performed in response to receiving in the first type of session a hypertext transfer protocol response message that comprises a predetermined multipurpose internet mail extensions type indicating that the second type of session is being initiated, the second type of session being identified by an identifier embedded in the hypertext transfer protocol response message.

17. A computer useable memory tangibly embodying a computer readable program, wherein the computer readable program when executed on a computer causes the computer to perform operations, comprising:

transmitting a certain type of hypertext transfer protocol request message during a first type of session and in response, receiving a certain type of hypertext transfer protocol response message, the certain type of hypertext transfer protocol response message comprising a dedicated multipurpose internet mail extensions type indicating that a second type of session is being initiated, the second type of session being a different type of session from the first type of session, the second type of session being identified by an identifier embedded in the certain type of hypertext transfer protocol response message;

in response to receiving the certain type of hypertext transfer protocol response message transmitting in the second type of session a device management session reply that comprises device details and the identifier, where the device details comprise at least one of a device identifier and a firmware identifier;

receiving in the first type of session a list comprising at least one download option that is descriptive of downloadable information that is compatible with the device details;

transmitting a user selection of the at least one download option from the list; and receiving the selected at least one download option to the device during a second type of session, where the first type of session is used for communication between a web server and a web browser running on the device and the second type of session is used for communication between a device management server and a device management client running on the device.

18. A computer readable memory as in claim 17, where the certain type of hypertext transfer protocol response message comprises an encrypted client provisioning message.

19. A computer readable memory as in claim 17, where the delivered downloadable information comprises an application program.

20. A computer readable memory as in claim 17, where the delivered downloadable information comprises firmware.

* * * * *